United States Patent Office 3,230,655
Patented Jan. 25, 1966

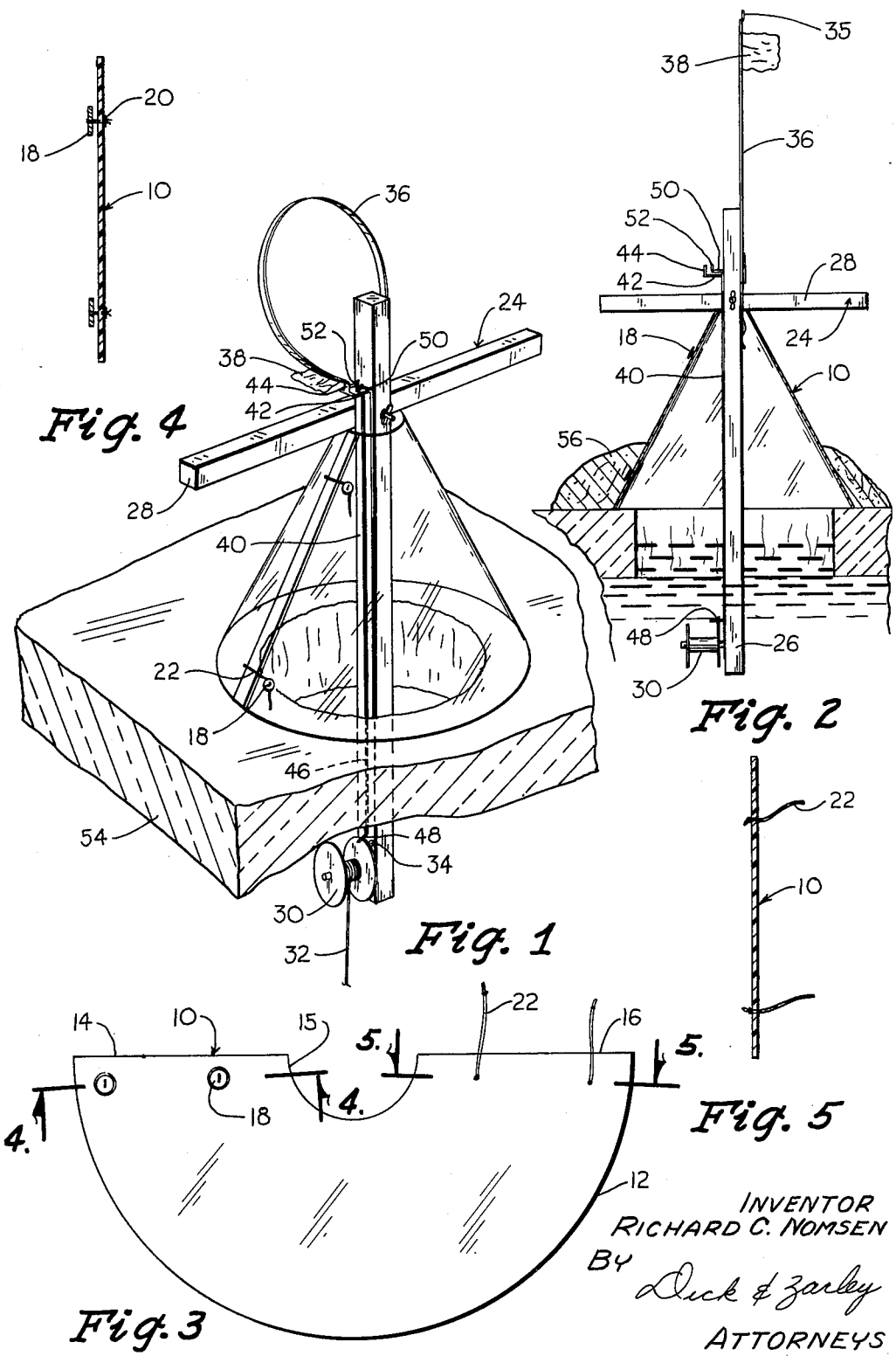

3,230,655
FISHING DEVICE
Richard C. Nomsen, Rte. 3, Garner, Iowa
Filed Nov. 12, 1963, Ser. No. 323,036
1 Claim. (Cl. 43—17)

This invention relates to a fishing device and more particularly to an ice fishing device.

Winter fishing or ice fishing has become very popular during the last few years. The usual method of fishing through ice is by chopping or drilling a hole in the ice of suitable size. A fishing line or a tip-up apparatus is extended downwardly through the hole in the ice.

The cold air has a tendency to freeze the water around the fishing line or tip-up and the water must be constantly agitated to keep the hole clear. In addition, falling or blowing snow has a tendency to find its way into the hole thereby cauisng "slush" to form which freezes quite rapidly. If a fisherman has three or four fishing holes in the ice to supervise he must constantly move from ice hole to ice hole to keep the hole from freezing.

Therefore, a principal object of the invention is to provide a device which will prevent ice holes from freezing over.

A further object of the invention is to keep the cold air of the atmosphere from contacting the fishing hole.

A further object of the invention is to keep falling or blowing snow from entering the fishing hole.

A further object of the invention is to provide a device which can be used with either an ordinary fishing line or with a tip-up signal device.

A further object of the invention is to provide a device which can be quickly assembled or disassembled in cold weather.

A further object of the invention is to provide a device which requires a small amount of storage space.

A further object of the invention is to provide a device which is economical of manufacture, durable in use and refined in appearance.

These and other objects will be apparent to one skilled in the art.

This invention consists in the construction, arrangements, and combination, of the various parts of the device, whereby the objects contemplated are attained as hereinafter more fully set forth, specifically pointed out in the claim, and illustrated in the accompanying drawings, in which:

FIG. 1 is a perspective view of the device in an assembled and operating position, at a reduced scale.

FIG. 2 is a cross-sectional view of the device at a reduced scale.

FIG. 3 is a top elevational view of the disassembled sheet member at a reduced scale.

FIG. 4 is a cross-sectional view of the device as seen on line 4—4 of FIG. 3 at an enlarged scale.

FIG. 5 is a cross-sectional view of the device as seen on line 5—5 of FIG. 3 at an enlarged scale.

The numeral 10 generally designates a flat, flexible sheet member which is semi-circular in shape having curved edge 12, a first straight edge 14, a second straight edge 16 and a curved cut-away area 15 between edges 14 and 16. A plurality of buttons 18 are secured to one side of sheet member 10 adjacent straight edge 14 by sewing or any convenient method. When applicant sews buttons 18 to sheet member 10, a small back up member 20 is provided on the opposite side of sheet member 10 through which the thread is sewed as illustrated in FIG. 4. This back up member 20 prevens the thread from pulling through sheet member 10. Each of buttons 18 are substantially equidistant from straight edge 14. A plurality of cords 22 are secured to the same side of sheet member 10 as buttons 18 and are adjacent straight edge 16. The cords 22 are substantially equidistant from straight edge 16 and are secured to sheet 10 by knots which prevent the cords from passing through suitable apertures in the sheet. Cords 22 are arranged in a substantially opposite pattern, with respect to sheet member 10, to buttons 18.

I have used the numeral 24 to generally designate a fishing device commonly called a tip-up or a fish signaling mans. Tip-up 24 is comprised of a first elongated arm member 26 and a second elongated arm member 28 pivotally secured to arm member 26 intermediate its length. A fishing reel 30 with fishing line 32 secured thereto is rotatably secured to the lower end of arm member 26. An arcuate shaped lip 34 extends from the innermost edge of reel 30. A flagstaff 36 is secured to the upper portion of arm member 26 and has secured thereto flag 38. Attached to a side of arm member 26 is an elongated bar 40 having a flange 42 extending at a right angle thereto. Flange 42 has a flagstaff retaining shoulder 44 adapted to receive the curved upper portion 35 of flagstaff 36. Embraced between bar 40 and arm member 26 is rod 46 which terminates at its lower end in a shorter rod member 48, which in turn is adapted to be engaged by lip 34 on reel 30. Rod 46 has at its upper end a second rod member 50 which extends outwardly at a right angle thereto and which terminates in a third rod member 52 extending upwardly at a right angle to rod member 50. Rod member 52 is adapted to engage curved portion 35 of flagstaff 36 when curved portion 35 is secured to retaining shoulder 44. The numeral 54 generally designates ice. The numeral 56 generally designates snow.

The usual method of operation of the device is as follows. Sheet member 10 is formed into a frusto-conical shaped figure by merely bringing straight sides 14 and 16 together and in a super-imposed position. Cords 22 are entwined around corresponding buttons 18. The entwinement of the cords 22 around buttons 18 will hold sheet member 10 in the frusto-conical shaped figure illustrated in FIGS. 1 and 2. The device is then placed over a fish hole which has been chopped or drilled in the ice. Fish signaling means 24 is then placed on the frusto-conical shaped member by extending arm member 26 downwardly through the hole formed by cut-away area 15. Arm member 28 is then placed in a horizontal position and substantially at a right angle to arm member 26 and caused to rest upon the top of the frusto-conical shaped figure. A length of fish line 32 is permitted to extend downwardly from fish reel 30 with a fish hook secured to its lower end. The curved portion 35 of flagstaff 36 is then moved downwardly and temporarily secured to shoulder 44. The spring tension of flagstaff 36 causes the curved portion 35 to remain secured to shoulder 44. Upon the occurrence of a fish being caught by the fish hook, the pull on the line 32 by the fish will cause reel 30 to rotate. Rotation of fish reel 30 will cause lip 34 to engage rod member 48 and rotate the same. Rotation of rod member 48 causes rod member 52 to disengage curved portion 35 of flagstaff 36 from shoulder 44. Flagstaff 36 then springs to an upright position signaling that a fish has been caught.

If fish signal means 24 is not desired an ordinary fishing line may be extended downwardly through the device.

The frusto-conical shaped member device will keep cold air of the outside atmosphere from contacting the ice hole thereby keeping the hole from freezing over. In addition, the device will prevent falling or blowing snow from entering the ice hole which would cause slush to form and aiding the freezing process. By constructing the device of transparent material the rays of the sun will be permitted to pass through the device which will warm up the air inside the device. This warm air will further prevent freezing of the water in the ice hole. In providing for cords 22 to entwine around buttons 18 applicant provides a convenient means for assembly and disassembly of the device. This procedure can be easily accomplished although the fisherman is wearing gloves. While applicant has found his fastening means to be the most convenient, any method could be used such as hook and eyelets, snap fasteners, etc. When the unit is disassembled the flat sheet member will be very compact and easy to store.

It is obvious that the device will accomplish at least all of its stated objectives.

Some changes may be made in the construction and arrangement of my fishing device without departing from the real spirit and purpose of my invention, and it is my intention to cover by my claim, any modified forms of structure or use of mechanical equivalents which may be reasonably included within its scope.

I claim:

In combination,
- a flat, flexible sheet member having a semi-circular shape,
- said sheet member having a curved edge, a first straight edge, a second straight edge and a curved cut-away area between said first and second straight edges,
- said sheet member having means thereon to maintain said sheet member in a hollow, frusto-conical shape and having upper and lower ends; said lower end being positioned around an opening formed in a body of ice at times and extending only upwardly therefrom,
- a fish signaling means having a first arm member extending downwardly through said cut-away portion of said flat member when said flat member is maintained in a frusto-conical shape, said fish signaling means being supported by said sheet member when said sheet member is in a frusto-conical shape and said first arm member extends through said cut-away portion,
- said first arm member having a flat, elongated member secured thereto along one of its sides,
- said flat, elongated member having a flange extending outwardly from the upper portion thereof at a right angle and a retaining shoulder extending upwardly from said flange,
- said first arm member having secured thereto at its upper end a flexible flagstaff,
- said flagstaff having a flag means secured thereto intermediate its length,
- said flagstaff terminating in a curved portion at its upper end,
- an elongated rod rotatably embraced between said flat, elongated member and said first arm member,
- said elongated rod terminating at its lower end in a second rod member extending outwardly at a right angle thereto, said elongated rod having at its upper end a third rod member extending outwardly at a right angle thereto, said third rod member terminating in a fourth rod member extending at a right angle thereto and adapted to engage the curved portion of said flagstaff when said curved portion is engaged with said retaining shoulder, said first arm member having a reel means rotatably secured to its lower end,
- said reel means having a lip member adapted to engage said second rod member and cause pivotal movement thereof.

References Cited by the Examiner

UNITED STATES PATENTS

| | | | |
|---|---|---|---|
| 1,253,746 | 1/1918 | Teeling | 43—17 |
| 1,668,372 | 5/1928 | Kleebauer et al. | |
| 2,605,582 | 8/1952 | Allen | 43—100 |
| 2,651,875 | 9/1953 | Brockman | 43—17 |
| 2,837,856 | 6/1958 | Ellison | 43—17 |
| 2,883,784 | 4/1959 | Obernolte | 43—4 |
| 2,970,400 | 2/1961 | Nolin | 43—17 |

SAMUEL KOREN, *Primary Examiner.*

ABRAHAM G. STONE, *Examiner.*